April 20, 1954  D. P. ECKMAN ET AL  2,675,819
AIR CONTROL RELAY WITH MULTIPLE RESPONSES
Filed Nov. 14, 1947  2 Sheets-Sheet 1
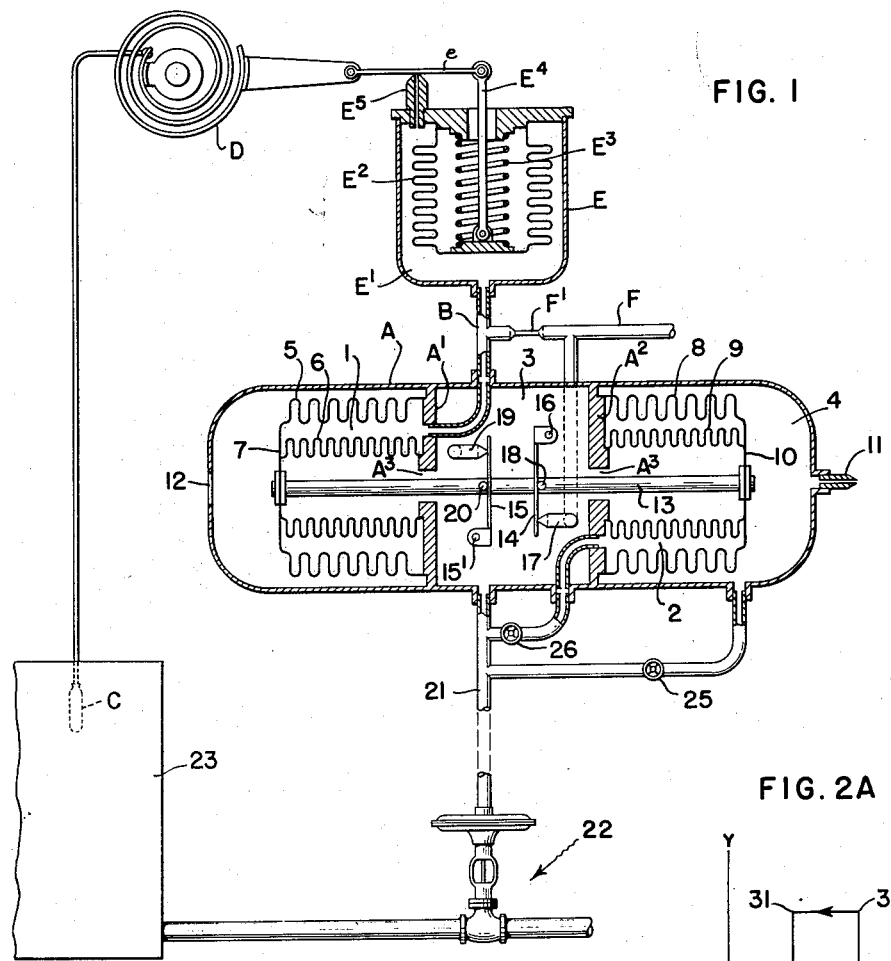
FIG. 1
FIG. 2A
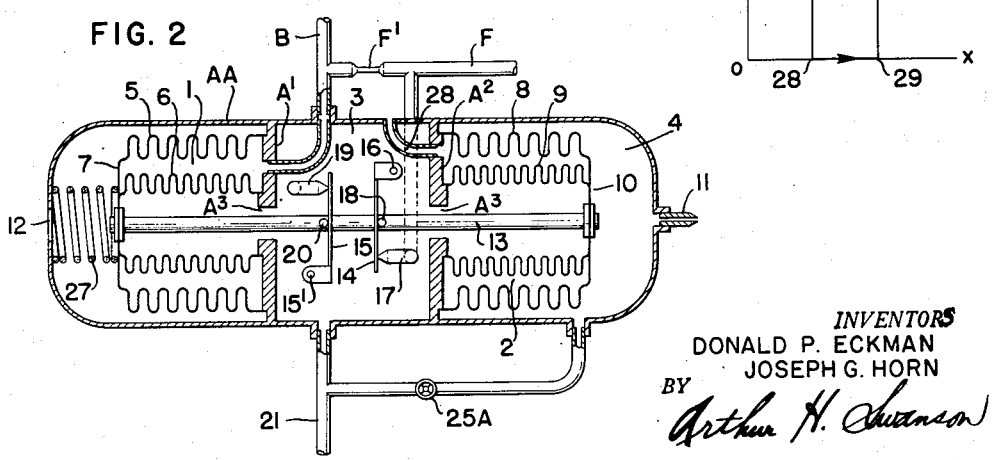
FIG. 2
INVENTORS
DONALD P. ECKMAN
JOSEPH G. HORN
BY
Arthur H. Swanson
ATTORNEY.

April 20, 1954  D. P. ECKMAN ET AL  2,675,819
AIR CONTROL RELAY WITH MULTIPLE RESPONSES
Filed Nov. 14, 1947  2 Sheets-Sheet 2

*INVENTORS*
DONALD P. ECKMAN
JOSEPH G. HORN
BY Arthur H. Swanson
ATTORNEY.

Patented Apr. 20, 1954

2,675,819

UNITED STATES PATENT OFFICE 2,675,819

AIR CONTROL RELAY WITH MULTIPLE RESPONSES

Donald P. Eckman, Ithaca, N. Y., and Joseph G. Horn, Drexel Hill, Pa., assignors, by mesne assignments, to Minneapolis-Honeywell Regulator Company, Minneapolis, Minn., a corporation of Delaware Application November 14, 1947, Serial No. 785,990

9 Claims. (Cl. 137—86)

The general object of the present invention is to provide improved air controllers of the type in which a null balance pilot valve mechanism is built into the controller and is actuated by the resultant of forces due to the different air pressures acting on the movable walls of a plurality of separate expansible pressure chambers included in the controller. A primary object of the present invention is to extend the field of use of air controllers of the above type by a relatively simple and practically effective combination in each controller of a sufficient number of pressure chambers having movable walls to give the air controller novel and practically important characteristics and to enable it to produce advantageous results not obtainable with prior apparatus of the same general type, or of similar simplicity and effectiveness.

A more specific object of the invention is to provide an air controller of the above mentioned type, including a novel, mechanically simple, and effective combination of at least four expansible pressure chambers, each having a movable wall, with mechanism for regulating the relative pressures in said chambers and utilizing those pressures in producing one or another plurality of desirably related control actions, including proportional control and rate response actions; proportional and floating control actions; proportional control and reset actions; proportional control, reset and rate response actions; floating control and rate response actions; and two position control with adjustable differential gap regulation actions.

The various features of novelty which characterize our invention are pointed out with particularity in the claims annexed to and forming a part of this specification. For a better understanding of the invention, however, its advantages, and specific objects attained with its use, reference should be had to the accompanying drawings and descriptive matter in which we have illustrated and described preferred embodiments of the invention.

Of the drawings:

Fig. 1 is a somewhat diagrammatic view of an air control system for effecting proportional control and rate response actions;

Fig. 2 is a somewhat diagrammatic view of an air controller unit for effecting two position control with a differential gap regulation;

Fig. 2A is a diagram illustrating the differential gap regulation attainable with the apparatus shown in Fig. 2;

Figure 3:
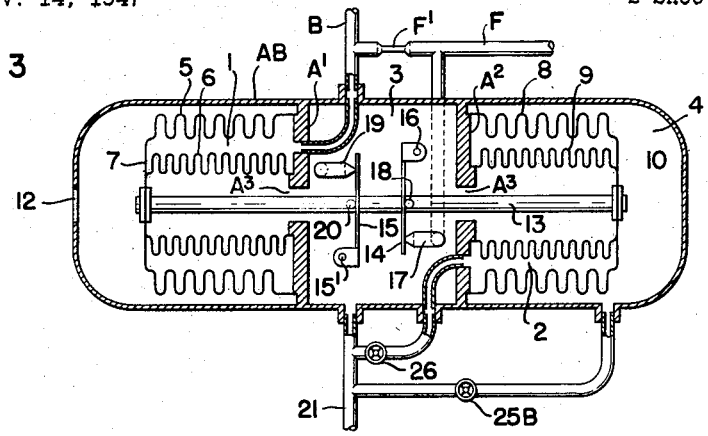
Fig. 3 is a somewhat diagrammatic view of an air controller for effecting floating control and rate response actions.

In Fig. 1 we have illustrated by way of example a control system in which A designates a desirable form of our improved air controller arranged to provide proportional control with rate response in response to variations in the controller input pressure transmitted to the controller A through a pipe B, and varying in predetermined proportion to the value of the controlled variable. The latter may be any one of a wide variety of quantities or conditions, and the manner in which the control air pressure is maintained in predetermined proportion to the value of said variable, forms no part of the present invention.

As shown by way of illustration and example in Fig. 1, the controlled variable is a temperature to which a fluid pressure thermometer bulb C is exposed. The bulb pressure is transmitted to a Bourdon tube D, which adjusts the control valve $e$ of a pneumatic relay or transmitter E of a well known form having a pressure chamber E'. The chamber E' is connected to a compressed air supply pipe F through a portion of the pipe B and a restricted passage F''. A portion of the wall of the chamber E' is formed by a bellows element $E^2$ subjected to a collapsing force by the air in the chamber. Said collapsing force is opposed by a bias or measuring or calibrated spring $E^3$, so that the varying length of the bellows element is a measure of the varying pressure in the chamber E'. The movable end of the bellows element $E^2$ is connected by a link $E^4$ to the valve $e$ to give the latter follow-up adjustments on changes in the pressure in the chamber E'. The link $E^4$ and Bourdon tube D jointly adjust the valve $e$ to proportion the air pressure in the chamber E' to the temperature of the bulb C, by variably throttling the escape of air from the chamber E' to the atmosphere through a bleed nozzle $E^5$.

In Fig. 1, A designates the air controller unit proper. That unit comprises a housing or casing body structure having stationary and movable internal partitions which form four expansible pressure chambers 1, 2, 3 and 4. The two stationary internal partitions are parallel, spaced apart elements A' and $A^2$, formed with registering central apertures $A^3$. The expansible chamber 1 is at the left hand side of the stationary partition $A'$, and comprises the annular space between outer and inner tubular corrugated bellows elements 5 and 6, each coaxial with the registering openings $A^3$. The right ends of the bellows elements 5 and 6 are attached to the stationary partition $A'$, and their left ends are attached to a common movable end wall member 7.

The expansible chamber 2 is at the right of the stationary partition member $A^2$ and comprises the annular space between outer and inner tubular bellows elements 8 and 9, each of which has its left end attached to the stationary partition $A^2$, and has its right hand end connected to a common movable end wall member 10. For a purpose hereinafter explained, the bellows element 9 is of larger diameter than the bellows element 6.

The expansible chamber 3 comprises the fixed space between the partitions $A'$ and $A^2$ and the expansible spaces surrounded by the inner bellows elements 6 and 9, respectively. The expansible chamber 4 comprises the space at the right of the partition $A^2$ between the controller housing structure A and the movable internal partition wall formed by the bellows element 8 and end wall member 10. The chamber 4 is in restricted communication with the atmosphere through a bleed orifice 11. While the housing structure of the controller A advantageously extends about and forms a protective enclosure for the bellows element 5 and end wall member 7, the space between the casing and the last mentioned wall and member is in free communication with the external atmosphere through a port or ports 12.

The end wall members 7 and 10 are connected to move together by a cross-bar or connecting rod 13 coaxial with said end walls and partition openings $A^3$, and extending through the latter. The axial movements of the rod 13 control the pressure in the chamber 3 and so relate that pressure to the pressures in the chambers 1, 2 and 4 as to normally maintain the rod in a predetermined normal position.

The rod 13 regulates the pressure in the chamber 3 by giving an opening adjustment to a normally closed supply valve 14 when the rod is displaced to the left from its normal position, and by giving an opening adjustment to a normally closed vent valve 15 when the rod is displaced to the right from its normal position. The valve 14, as shown, is a flapper type valve pivoted at 16 and biased for turning movement into the position in which it engages a supply nozzle 17 and closes the discharge orifice thereof. The nozzle 17 extends into the chamber 3 through the controller housing body, and is connected externally of the latter to the compressed air supply pipe F. When the rod 13 moves to the left from its normal position, a projection 18 carried by said cross-bar engages the valve 14 and moves it out of engagement with the nozzle 17, and the latter then discharges air into the chamber 3 and increases the pressure therein. The flapper type valve 15 is pivoted at 15' and is biased for movement into a position in which it engages a vent pipe 19 and closes the inner end of the vent passage in said pipe. The vent passage is open at its outer end to the external atmosphere. On movement of the cross-bar 13 to the right from its normal position, a projection 20 from the rod engages the valve 15 and moves the latter out of engagement with the vent pipe so as to open the vent passage therein and thereby reduce the air pressure in the chamber 3.

The controller output pressure maintained in the chamber 3, is transmitted through the output pipe 21 to the pressure chamber of the final control element 22 of the control system. As diagrammatically shown by way of example, the final control element 22 is a regulator in the form of a fluid pressure actuated fuel valve, regulating the supply of fuel to a heater 23, to the temperature in which the thermometer bulb C is responsive. In the arrangement shown in Fig. 1, the valve 22 is spring biased to its open position, and the pressure transmitted from the chamber 3 to the valve 22 closes the latter to an extent varying with said pressure. Changes in the output pressure maintained in the chamber 3 and pipe 21 operate through a flow restricting proportional band or throttling range control valve 25 and through a flow restricting rate valve 26, to produce related pressure changes in the pressure chambers 4 and 2, respectively, of the air controller A.

When the pressure in the chamber 3 is higher or lower than the pressure in the chamber 2, air tends to flow respectively into or out of the chamber 2 through the valve 26, until the pressures in the two chambers become equal. Similarly, air flows through the valve 25 into or out of the chamber 4 when the pressure in that chamber is respectively higher or lower than the pressure in the output chamber 3.

Usually when the pressures in the chambers 3 and 4 are unequal, the pressure in the chamber 3 is higher than the pressure in the chamber 4, and in such case air flows continuously from the chamber 3 into the chamber 4, since when the pressure in the chamber 4 is higher than the pressure of the atmosphere, air flows out of the chamber 3 through the vent outlet 11. In regular operation, the pressure in the chamber 4 exceeds the pressure in the chamber 3 only for a brief interval following each reduction of the pressure in the chamber 3 to atmospheric pressure from a higher pressure at a time when the pressure in the chamber 4 is above the pressure of the atmosphere. Equality of the pressures in the chambers 3 and 4 can not be maintained during periods in which the pressure in the chamber 3 exceeds the pressure of the atmosphere. The pipe B transmits the controller input pressure from the relay chamber $E'$ to the controller chamber 1. The latter may thus be called the input chamber.

In the normal balanced condition of the apparatus shown in Fig. 1, with the valves 25 and 26 partly open and with the temperature of the thermometer bulb C at its normal or cut off value, the valves 14 and 15 are both substantially closed and the pressure in the chamber 3 is that required for the supply of fuel to the heater 23 at a steady predetermined normal rate. The pressure in the chamber 2 is then equal to the pressure in the chamber 3, and the pressure in the chamber 4 is less than the pressure in the chamber 3, and is in excess of the pressure of the atmosphere by an amount respectively dependent on the pressure drops in the air flowing through the band valve control 25, and flowing through the restricted vent 11. The valve 15 is then fully closed, but the valve 14 must then permit the slight flow of air into the chamber 3 required to make up for the air flowing to the atmosphere through the restricted outlet 11 of the chamber 4.

On an increase in the heater temperature, due, for example, to a reduction in the heat requirements of the heater, the pressure transmitted from the thermometer bulb C to the Bourdon tube D is increased. The latter thereupon moves the valve e toward the nozzle E⁵ and thereby increases the air pressure transmitted from the relay chamber E² to the chamber 1 of the air controller unit A.

The pressure increase in the chamber 1 moves the cross-bar 13 to the left, thereby opening the inlet valve 14 and increasing the pressure in the chamber 3. The pressure increase in the chamber 3 results immediately in a short initial follow-up movement of the cross-bar 13 to the right.

That initial follow-up movement is quickly terminated as a result of the reduction of the pressure in the chamber 2 and the increase in the pressure in the chamber 4 caused by the corresponding movement to the right of the end wall member 10. However, the rapid initial follow-up movement is followed by a further slow follow-up movement of the cross-bar 13 to the right which results from the flow of air from the chamber 3 into the chamber 2 through the restricted flow passage provided by the rate response valve 26. The length of the total follow-up movement depends on the adjustment of the band control valve 25 which, in conjunction with the rstricted vent 11, regulates the difference between the pressures in the chambers 3 and 4, and eventually arrests the expansion of the chamber 2 resulting from the flow of air into the chamber through the valve 26.

As will appear from the foregoing explanations, the valve 25 regulates the throttling range or proportional band of the air controller, and the valve 26 and chamber 2 cooperate to delay all but the small initial portion of the follow-up action. That retardation of the follow-up action is a rate response action which permits a temporary opening or closing adjustment of the regulator valve 22 in response to a given change in the bulb temperature, which is greater than would occur if the follow-up action were not retarded.

As will be apparent, when the thermometer bulb temperature decreases below its control point value, control actions are effected which are the converse of those effected when said temperature increases above its control point value.

In Fig. 2 we have illustrated a form of our invention adapted for use as a two position air controller AA with adjustable differential gap, i. e., with an adjustable difference between the value of the controlled variable at which the controller output pressure is abruptly reduced to equality with the pressure of the atmosphere, and the lower value of the controlled variable at which the output pressure is abruptly increased to approximate equality with the air pressure in the supply pipe F. Notwithstanding the wide difference between the two position control action of the controller AA and the proportional control and rate response actions of the controller A, the structural differences between the two controllers may be slight. As shown, they consist only in the addition of a bias spring 27, and the replacement of the valved connection between the output pipe 21 and the chamber 2 of the controller A of Fig. 1, by a simple vent connection 28 to the atmosphere from the chamber 2 of the controller AA of Fig. 2. The input pressure in the pipe B and the output pressure in the pipe 21 of the controller AA may, or may not, be respectively derived from a thermometer bulb temperature and utilized to adjust a fuel regulator valve as in Fig. 1.

Th bias spring 27 is shown as a compression spring arranged to act between the end wall member 7 and the adjacent end of the controller housing. It provides a bias force action on the rod 13 needed to hold the latter far enough to the right to maintain the inlet valve 14 in its closed position at times when the only fluid pressure opposing movement of the rod to the left is equal to the pressure of the atmosphere, and in which the value of the input pressure is lower than the desired maximum required for the attainment of the required differential gap. The bias force supplied by the spring 27 may be supplied in other ways. For example, it may be supplied in whole or in part by the natural resiliency of the various bellows elements 5, 6, 8 and 9 when the latter are made of thin resilient metal, as is customary, and are arranged as to be under a tension opposing movement of the rod 13 to the left from the position which permits the valve 14 to close.

The character of the operation of the apparatus shown in Fig. 2 depends upon the adjustment of the valve 25A which connects the output pipe 21 to the chamber 4 of the controller AA. The valve 25A of Fig. 2 may be structurally identical with the throttling range control valve 25 of Fig. 1, but in the combination of Fig. 2, the valve 25A serves the special purpose of regulating the differential gap action of the controller AA. It is to be noted, however, that a differential gap results from a negative follow-up action, and a large subsequent positive follow-up action. As used herein the term "negative follow-up action," means an adjustment of the rod 13 in one direction which is caused by a preceding adjustment of the rod 13 is the opposite direction resulting from and produced by a change in the pressure transmitted to the chamber 1; and a "positive follow-up action" is one which affects an adjustment of the rod 13 in the same direction as the preceding adjustment of the rod 13 produced by a change in the pressure in the chamber 1.

When the differential gap valve 25A is partly open, an increase in the input pressure which moves the rod 13 to the left and opens the valve 14, increases the pressure in the chamber 3 and thereby causes a movement of the rod 13 to the right as a result of the fact that the diameter of the bellows 9 exceeds the diameter of the bellows 6. The adjustment of the rod 13 to the right gives a closing adjustment to the valve 14 and is a "negative follow-up action." The increase in the pressure in the chamber 3 resulting from the initial adjustment of the rod 13 to the left causes a flow of air through the valve 25A into the chamber 4 and increases the pressure in the last mentioned chamber. The pressure increase in the chamber 4 occurs somewhat more slowly than the pressure increase in the chamber 3, and results in an adjustment of the rod 13 to the left. The last mentioned adjustment of the rod 13 is a "positive follow-up action" and directly results from the fact that the pressure increase in the chamber 4 acts against the entire area of the bellows end wall 10, whereas the increase in pressure in the chamber 3 operates effectively only on a relatively small portion of the area of the end wall 10.

The overall result of the initial adjustment of the rod 13 to the left and the subsequent adjustment of the rod in the same direction produced by the "positive follow-up action," is to increase the pressure in the chamber 3 to equality with the pressure in the supply pipe F. The maximum pressure in the chamber 3 thus established results in the closure of the valve 22 and a subsequent reduction in the temperature of the bulb C. When the closure of the valve 22 has caused a reduction in the bulb temperature which produces a sufficient reduction in the pressure in the input chamber 1, the rod 13 is moved to the right and gives an opening adjustment to the valve 15. The resultant reduction in the pressure in the chamber 3 below the pressure in the chamber 4, produces a movement of the rod 13 to the left. The last mentioned rod movement is a "negative follow-up action" moving the rod 13 to the right, and resulting from the reduction in the pressure in the chamber 4 due to the flow of air from the chamber 4 into the chamber 3 through the differential gap valve 25A.

When the valve 25A is fully closed, there is no significant "positive follow-up action," and no significant differential gap is then attainable. The rod 13 can then occupy its normal position in which the flapper valves 14 and 15 are both closed only when the thrust against the end wall 7 of the input pressure in the chamber 1 balances the sum of the forces due to the bias spring 27 and the net thrust force to the right of the pressure in the chamber 3 which acts against a portion of the end wall 7 and against a larger portion of the end wall 10. This balanced condition of the apparatus may be attained only momentarily at the instant at which the pressure in the chamber 3 is rapidly changing between its maximum and minimum values, and the opening of either of the valves 14 or 15 then quickly creates a pressure condition causing the other valve to open. With the valve 25A closed, the controller AA thus operates to effect simple on-off control.

Owing to the relative areas of the portions of the end walls 7 and 10 on which the output pressure and chamber 4 pressure act respectively, the magnitude of the positive follow-up action exceeds that of the negative follow-up action by a significant amount when the valve 25A is suitably adjusted. In consequence of such positive follow-up adjustment, the input pressure in the chamber 1 must be substantially higher when it opens the inlet valve 14, than when it opens the vent valve 15. This differential gap between the inlet and outlet valve opening pressures may be varied by adjustment of the valve 25A.

The character of the operation of the air controller AA with the valve 25A partly open, is diagrammatically illustrated in Fig. 2A, wherein vertical displacements from the horizontal axis OX represent output pressures in the controller chamber 3 and pipe 21, and horizontal displacements from the vertical axis OY represent input pressures transmitted to the chamber 1 by the pipe B. The rectangular figure 28, 29, 30 and 31, of Fig. 2A illustrates the variations in the output and input pressures occurring in a normal cycle of operation with the particular throttling adjustment of the valve 25A required for the differential gap represented by the horizontal displacement of the line 31—28 from the line 29—30 shown in Fig. 2A.

It may be assumed, for example, that the cycle of operation starts when the output and input pressures, i. e., the pressures in chambers 3 and 1, respectively, attain their respective values represented by the point 28. Those values have been attained as a result of a previous movement of the rod 13 to the right which has opened the vent valve 15 and reduced the output pressure in the chamber 3 to equality with the pressure of the atmosphere. That movement of the rod 13 has resulted from the reduction of the input pressure to its minimum value indicated by the displacement of the point 31 from the line OY. The reduction of the output pressure to its minimum value, indicated by the point 28, causes fuel to be supplied through the regulator valve 22 at the maximum rate. In consequence, during the first stage in the cycle, assumed to start at the point 28, the thermometer bulb temperature increases until the input pressure in the chamber 1 is increased from its minimum value represented by the point 28, to its maximum represented by the point 29. The increase in the input pressure to the value represented by the point 29 neutralizes the effect of the excess of the positive follow-up action over the negative follow-up action resulting from the previous reduction of the output pressure to equality with the pressure of the atmosphere. In consequence, when the input pressure attains its point 29 value it moves the rod 13 to the left and opens the inlet valve 14.

When the valve 14 is thus opened, the output pressure almost instantly builds up to its maximum value indicated by the point 30. This abrupt increase in the output pressure actuates the regulator valve 22 to cut off the supply of fuel and thus initiates a reduction in the thermometer bulb temperature and input pressure applied to the chamber 1. It also results in a negative follow-up action and in a greater positive follow-up action. In consequence, during the third stage of the cycle, the input pressure must fall to the value represented by the point 31 before it permits the movement of the rod 13 to the right required to open the vent valve 15. The opening of the vent valve results in the abrupt decrease in the output pressure from its point 31 value to its point 28 value and thus completes the operation cycle illustrated in Fig. 2A.

The form of our invention embodied in the air controller AB shown in Fig. 3 is operative to effect floating control with rate response. The controller AB differs structurally from the controler A of Fig. 1 only in that it includes no bleed orifice or vent 11 to the atmosphere from the chamber 4. On the occurrence of an increase in the controlled variable, which may, or may not be a thermometer bulb temperature as in Fig. 1, the increase in the input pressure transmitted through pipe B to the chamber 1, moves the rod 13 to the left and thereby gives an opening adjustment to the inlet valve 14 and increases the pressure in the chamber 3. The pressure increase in the chamber 3 is transmitted to the chamber 4 through the partially open floating control valve 25B connecting the chamber 4 to the output pressure pipe 21 and thereby to the chamber 3.

In consequence of the omission of the vent 11 and the relative areas of the end members 7 and 10 respectively exposed to the pressures in the chambers 3 and 4, the pressure increase in the chamber 4 gives the rod 13 a further or positive follow-up movement to the left. Such further movement of the rod 13 to the left increases the pressure in the chamber 3, and thereby effects a corresponding further pressure increase in the chamber 4. In consequence of the actions described, the pressures in the chambers 3 and 4 progressively increase, though with the pressure in the chamber 4 lagging behind the pressure in the chamber 3, until the control action of the regulator 22 or analogous final control element reduces the input pressure transmitted to the chamber 1 to its normal value, or until the final control element reaches the limit of its adjustment in response to an increase in the pressure in the chamber 3.

The effect of the chamber 4 pressure lag behind the output pressure as both of said pressures are being increased, may be diminished by the action of the rate valve 26 in retarding the change in the pressure in the chamber 2 produced by a change in the output pressure. The retarding action of the rate valve 26 may be increased or decreased by adjustment of the valve to respectively increase or decrease its throttling effect.

Operations which are the converse of those described, occur when the deviation of the controlled variable is in the direction to effect a reduction in the input pressure transmitted to the chamber 1 of the controller AB. In such case, the pressures in the chambers 3 and 4 progressively diminish, but the reduction in the chamber 4 pressure lags behind the chamber 3 pressure reduction. Thus, regardless of its direction, each deviation of the controlled variable from its normal value, results in a corrective change in the output pressure of the controller AB, and that pressure continues to change until the controlled variable returns to its normal value, or until the regulator constituting the final control element reaches the limit of its adjustment in the direction in which it is then adjusted. Such adjustment of the output pressure is floating control, and the floating control rate may be adjusted by adjusting valve 25B to increase or decrease its throttling effect. The valve 25B may be identical in structure and capacity with the valve 25 of Fig. 1.

A change in the output pressure ultimately results in a similar change in the chamber 2 pressure, but the chamber 2 pressure change lags behind the output pressure change in the chamber 3. The lag in the pressure change in chamber 2, partially neutralizes the effect of the pressure change lag in the chamber 4 relative to the pressure change in the chamber 3. In consequence of such neutralization, the corrective effect of the output pressure change is greater than it would be without such neutralization. The conjoint effect of the chamber 2 and valve 26 and of the regulator AB, is thus a rate response effect or action.

Figure 4:
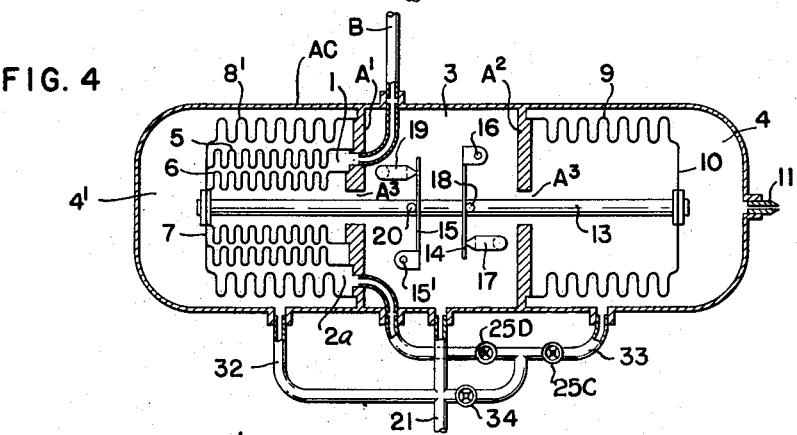
Fig. 4 is a somewhat diagrammatic view of an air controller in which four expansible chambers are combined to effect proportional control with a wide and readily adjustable proportional band.

In Fig. 4 we illustrate an air controller embodying a form of our invention and adapted to effect proportional control, and including novel means for obtaining an unusually wide and readily regulable throttling range or proportional band. The principal structural difference between the controller AC of Fig. 4 and the controller A of Fig. 1 is in respect to the arrrangement of the four tubular bellows elements included in the controllers. The controller AC includes three bellows elements corresponding generally to the bellows elements 5, 6 and 8 of Fig. 1, and forming movable walls for pressure chambers 1, 3 and 4, as in Fig. 1. The controller AC includes no bellows element 8 which cooperates with the bellows element 9 to form a pressure chamber 2, as in Fig. 1, but does include a bellows element 8' for which no direct counterpart is included in the controller A of Fig. 1. The bellows 8' of Fig. 4 surrounds the bellows element 5 and cooperates with the latter to enclose an annular pressure chamber 2a. The bellows element 8' has one end connected to the stationary partition A' and has its other end connected to the peripheral portion of the bellows end member 7. The left end portion of the controller housing unites with the end wall 7, bellows 8' and stationary casing part A' to form a pressure chamber 4' at the left end of the controller, which is somewhat analogous to the chamber 4 at the right end of the controller.

The chamber 4' is not in communication with the external atmosphere, but is in permanently open communication with the chamber 3 through the pipe 21 and branch pipe 32. The chamber 2a is in free communication with the chamber 4 through a pipe 33. The latter is in restricted communication with the pipe 21, and thereby with the chamber 3 through a proportional band control valve 34. A control pressure is transmitted to the chamber 1 of Fig. 4 by the pipe B from a suitable source of pressure proportional to the controlled variable. The immediate source of that pressure may or may not be a transmitter like the transmitter E of Fig. 1, and the controlled variable may or may not be a thermometer bulb temperature. The controller output pressure is transmitted from the chamber 3 through an output pipe 21 to an ultimate control element which may or may not be like the regulator 22 of Fig. 1, but in any event is adapted by its control action to return the controlled variable to its normal value when it deviates therefrom.

The controller AC is adapted to provide an unusually large negative follow-up, and a correspondingly wide throttling range. An unusually large negative follow-up action is obtained by subjecting the entire inner face of the bellows end member 10 and the entire outer face of the bellows end member 7 to the pressure in the chamber 3. With both of the large bellows end members thus subjected to the output pressure, and with the band control valve 34 closed, only a very small output pressure is required to balance a very large input pressure. When the band valve 34 is wide open, the output pressure is also applied to the outer side of the bellows end member 10 and to the annular portion of the inner side of the end member 7 between the bellows elements 5 and 8'. The opening of the band valve 34 thus greatly reduces the effective feedback action. In practice it has been found possible with apparatus of the type and form shown in Fig. 4, to obtain a throttling range of 900 percent when the valve 34 is closed, and a throttling range of only 115 percent when the valve 34 is wide open, by a selection of bellows elements having cross-sectional areas as follows:

Bellows 8' has a cross-sectional area of 2.91 sq. inches,
Bellows 5 has a cross-sectional area of 0.94 sq. inch,
Bellows 6 has a cross-sectional area of 0.22 sq. inch, and
Bellows 9 has a cross-sectional area of 2.91 sq. inches.

By adjusting the valve 34 to a suitable intermediate position, it is practically possible to provide a throttling range of any desired extent intermediate the 115 percent and 900 percent ranges. Other definite throttling range variations are obtainable without graduated adjustments of the band valve 34 by providing a separate cut-off valve in the conduit connection between each of the chambers 4 and 2a and the valve 34.

Valve 25C is located between valve 34 and chamber 4. Valve 25D is located between valve 34 and chamber 2a.

Figure 5:
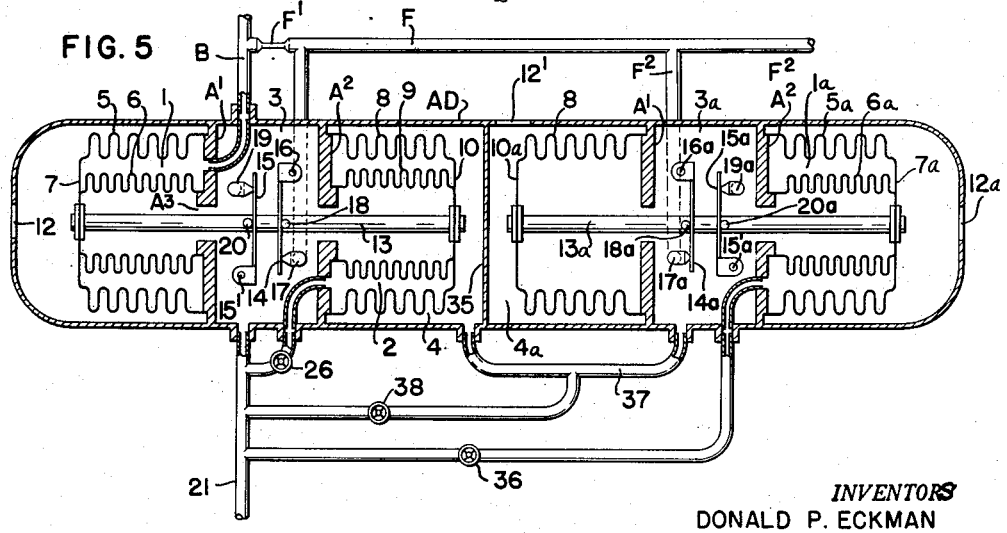
Fig. 5 is a somewhat diagrammatic view of an air controller for effecting proportional control, automatic reset and rate response actions.

The embodiment of our invention shown in Fig. 5 comprises novel provisions for supplementing proportional control with reset action. As is well known, the term "reset action" is applied to an adjustment of a proportional controller which minimizes the tendency of the controlled variable to deviate from its control point value on a change in the load on the controlled apparatus, such for example as a change in the heat demand on the furnace 23. The shell or housing body of the controller AD, shown in Fig. 5, is divided into right and left end sections by a central transverse partition 35. The portion of the controller housing body at the left of the transverse partition 35 includes stationary partitions and movable walls and associated parts combined to form a controller unit which is exactly like the single unit of the controller A of Fig. 1 except that it does not include the vent 11 to the atmosphere of Fig. 1. Thus, the left hand section of the controller AD comprises elements 1, 2, 3, 4, 5, 6, 7, 8, 9, 10, 12, 13, 14, 15, 16, 17, 18, 19 and 20, corresponding respectively to the similarly designated elements of Fig. 1.

The portion of the controller AD within the controller housing body at the right of the transverse portion 35, is a substantially oppositely facing counterpart of the portion of the controller within the housing body and at the left of the partition 35, except that the right hand section does not include a bellows element and pressure chambers corresponding to the element 9 and chamber 2 of the left hand section. Corresponding elements in the two sections are designated by the same numerical symbols, but with the letter "a" added to the numerical symbols applied to the elements of the right hand section. The control pressure proportional to the controlled variable is transmitted by the pipe B to the expansible chamber 1 of the left hand section of the controller AD, and the controller output pressure is transmitted from the chamber 3 of the left hand section of the controller through the output pipe 21 to the final control element. The controlled variable and the final control element may or may not be a temperature and a fuel valve, respectively, as in Fig. 1.

The output pressure in the chamber 3 of the controller AD, is transmitted to the controller chamber 1a through a reset valve 36. The chambers 4 and 3a of Fig. 5 are in free communication through a pipe 37, and the pipe 37 is connected to the output pressure pipe, and thereby to the chamber 3 through a throttling valve 38. The nozzle 17a is connected to the compressed air supply pipe F through a branch pipe F². The space between the walls 10a and 35 of the controller AD, is in free communication with the external atmosphere through an opening 12'.

The operation of a control system in which the control unit A of Fig. 1 is replaced by the air controller AD of Fig. 5 is as follows: A deviation of the controlled variable from its control point value increases the control pressure transmitted through the pipe B to the chamber 1, and thus moves the connecting rod 13 to the left and thereby gives an opening adjustment to the inlet valve 14. The resultant increase in the pressure in the chamber 3, acting against the end wall 10, gives the rod 13 a follow-up movement to the right. The throttling range or proportional band of the left hand section may be varied by adjustment of the valve 38 through which the chambers 3 and 4 are in restricted communication. The follow-up action is delayed and a regulable rate response is obtained by means of the valve 26, as in Fig. 1. The follow-up action just described is followed by a reset adjustment of the rod 13 as a result of the slow leakage through the reset valve 36 which is caused by the increase in the output pressure in the chamber 3 of the controller AD.

The development of the reset action may be explained as follows: The air leakage past the reset valve 36 increases the pressure in the chamber 1a of the right hand section of the controller AD and thus moves the connecting rod 13a to the right, thus opening the inlet valve 14a and increasing the air pressure in the chamber 3a. That pressure increase is transmitted through the pipe 37 to the chamber 4. The resultant increase in the pressure in the chamber 4 gives the rod 13 a slow reset adjustment to the left, and thereby gives an opening adjustment to the valve 14 which slowly increases the output pressure in the chamber 3. The slow increase in the output pressure is a reset action which continues until the normal control point valve of the controlled variable is restored.

As will be apparent without further explanation, operations which are the reverse of those just described occur when the deviation of the controlled variable from its normal value is in the direction to decrease the control pressure supplied to the chamber 1 by the pipe B. In such case, the reset action involves a decrease in the pressure in the chamber 1a and a resultant movement of the cross-bar 13a to the left which gives an opening adjustment to the vent valve 15a. That valve adjustment effects a corresponding reduction in the pressure in the chambers 3a and 4, and a reset movement of the cross-bar 13 to the right with a resultant slow reduction in the output pressure in the chamber 3.

The rate response action of the controller AD can be eliminated by the simple expedient of adjusting the valve 26 into its wide open position. With the valve 26 wide open, the apparatus shown in Fig. 5 operates exactly as it would if the valve 26 and the tubular bellows element 9 were both omitted, as they may be when rate response in the operation of the controller AD is not desired.

Our invention in all of the forms illustrated and hereinbefore described, is characterized by the simple and effective manner in which a multiplicity of movable pressure walls are combined to form a simple and effective controller for producing a control action including supplementary components which have not heretofore been produced by apparatus of similar type or character, or which is of similar simplicity and effectiveness. Inventive features included in the left hand section of the controller AD shown in Fig. 5 and not claimed herein, are disclosed and claimed in the prior application, Serial No. 651,273, filed March 1, 1946, now abandoned, by Donald P. Eckman, one of the applicants herein. Means for varying the proportional band or throttling range of an air controller in the general manner in which it is varied by adjustment of the valve 25 of Fig. 1 hereof, is not claimed generically herein, but is so claimed in the co-pending application of said Donald P. Eckman, Serial No. 786,245, filed of even date herewith.

The combination, collectively illustrated by Figs. 2 and 2A of the drawings herein for effecting two position control with an adjustable differential gap, is not claimed herein but is claimed in application S. N. 380,202 filed as a division of this application.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent, is:

1. An air controller comprising a casing body and stationary and movable partition walls forming separate input, output, third and fourth pressure chambers, each of which has a movable wall portion formed by one of said walls, means for maintaining an input pressure in said input chamber which varies in accordance with changes in a controlled variable, valve means adapted when adjusted in one direction or in the opposite direction to respectively admit air under pressure, and to vent air from said output chamber, movable valve operating means connected to each of said movable wall portions and actuated by movements of the latter to adjust said valve means in said one or in said opposite direction depending on the directions of said wall movements to thereby maintain an output pressure in said output chamber dependent on the pressure in all of said chambers, and means for maintaining in each of said third and fourth chambers a pressure in predetermined relation to said output pressure which is varied on a change in said output pressure and differs in a predetermined manner from said output pressure on a change in the latter.

2. An air controller according to claim 1 having means for maintaining in each of said third and fourth chambers a pressure separately derived from said output pressure.

3. An air controller according to claim 1 in which said means for maintaining in each of said third and fourth chambers a pressure comprises a separate restricted conduit connection between said output chamber and each of said third and fourth chambers.

4. An air controller according to claim 3 in which said fourth chamber is also in restricted communication with the external atmosphere.

5. An air controller according to claim 1 in which the movable partition walls are formed by four substantially coaxial tubular bellows elements arranged in spaced apart pairs within the casing body, each of said pairs comprising a smaller inner element and a larger outer element, the stationary partition walls being side by side and spaced apart and interposed between said two pairs of bellows elements and each connected to the adjacent ends of the adjacent pair of bellows elements, a pair of movable members each connecting the ends of one pair of bellows elements, which ends are opposite to the adjacent ends of each pair of bellows elements connected to the adjacent stationary partition wall, the annular space between the bellows elements of one pair forming said input pressure chamber, the annular space between the bellows elements of the other pair forming said third pressure chamber, each of said stationary partition walls having an aperture through which the space between said stationary partition walls is in communication with the space surrounded by that inner bellows element which is attached to that partition wall, said casing body uniting with said partition walls and said inner bellows elements and said movable members to form said output pressure chamber including the space between said stationary partition walls and the space surrounded by each of said two inner bellows elements, and to form said fourth pressure chamber enveloping the bellows element surrounding said third pressure chamber and said movable member at one end thereof, said movable valve operating means comprising a rod extending through said apertures and connected at each end to the adjacent movable member.

6. An air controller as specified in claim 5, in which the means for maintaining a predetermined relation between the output pressure and the pressures in each of said third and fourth pressure chambers comprises a separate throttling valve providing a variably restricted communication between said output pressure chamber and each of said third and fourth pressure chambers and in which said fourth pressure chamber is in communication with the atmosphere through a flow restricted passage.

7. An air controller as specified in claim 5, in which the means for maintaining a predetermined relation between the output pressure and the pressures in each of said third and fourth pressure chambers comprises a separate throttling valve providing a variably restricted communication between said output pressure chamber and each of said third and fourth pressure chambers whereby the pressures in said third and fourth chambers constantly tend to become equal to the pressure in said output pressure chamber.

8. An air controller as specified in claim 1 and having a fifth pressure chamber in said casing body, a reset valve connecting said output and fifth pressure chambers, a pair of throttling range control valves each providing restricted communication between said output chamber and one of said third and fourth chambers, other movable valve operating means responsive to the differential of the pressures in said fourth and fifth pressure chambers, and means actuated by said other movable valve operating means to discharge air from said fourth chamber on a predetermined increase in the pressure in that chamber relative to the pressure in the fifth chamber and to supply air under pressure to said fourth chamber on a predetermined decrease in the pressure in that chamber relative to the pressure in said fifth chamber.

9. An air controller according to claim 1 in which there is a fifth pressure chamber and in which the movable partition walls are formed by four substantially coaxial tubular bellows elements comprising first, second, third, and fourth bellows elements, said third bellows element being larger than and surrounding said first bellows element, said fourth bellows element being larger than and surrounding said third bellows element, said first and said third and said fourth bellows elements having their movable ends connected together, the annular space between the outside of said first bellows element and the inside of said third bellows element forming said input pressure chamber, the annular space between the outside of said third bellows element and the inside of said fourth bellows element forming said fifth pressure chamber, the stationary partition walls being side by side and spaced apart and interposed between said first and said second bellows element, each of said stationary partition walls having an aperture through which the space between said stationary partition walls is in communication with the space surrounded by the inside of said first or of said second bellows element, said casing body uniting with said partition walls and the inside of said first and of said second bellows element to form said output chamber, said movable valve operating means comprising a rod extending through said apertures and connected at each end to the movable end of said first and of said second bellows element, said fourth pressure chamber being at the opposite side of said partitions from said input chamber and enveloping the outside and the movable end of said second bellows element, said third pressure chamber enveloping the outside and the movable end of said fourth bellows element, said valve means actuated to admit air under pressure to or to discharge air from said output chamber on a movement of said rod in the longitudinal direction in which it is respectively moved on an increase or decrease in the axial force due to the input pressure relative to the resultant of the axial forces impressed on the rod by the pressures in the other pressure chambers, conduit means equalizing the pressures in said fourth and fifth chambers, a throttling valve providing a variably restricted communication between said output chamber and each of said fourth and fifth chambers, said fourth chamber being in communication with the atmosphere through a flow restricting passage, and conduit means providing free communication between said output chamber and said third chamber.

References Cited in the file of this patent

UNITED STATES PATENTS

| Number | Name | Date |
|---|---|---|
| 2,117,800 | Harrison | May 17, 1938 |
| 2,518,244 | Moore | Aug. 8, 1950 |
| 2,520,468 | Moore | Aug. 29, 1950 |

FOREIGN PATENTS

| Number | Country | Date |
|---|---|---|
| 544,643 | Great Britain | Apr. 22, 1942 |